(12) United States Patent
Suto

(10) Patent No.: US 7,308,235 B2
(45) Date of Patent: Dec. 11, 2007

(54) AUDIO BROADCAST RECEIVER AND AUTOMATIC BROADCASTING-STATION SELECTING METHOD

(75) Inventor: Shunichi Suto, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 613 days.

(21) Appl. No.: 10/958,212

(22) Filed: Oct. 4, 2004

(65) Prior Publication Data
US 2005/0101273 A1   May 12, 2005

(30) Foreign Application Priority Data
Oct. 7, 2003   (JP) .............................. 2003-347785

(51) Int. Cl.
*H04B 1/18* (2006.01)
(52) U.S. Cl. .................... 455/161.3; 455/179.1
(58) Field of Classification Search ............... 455/3.01, 455/161.1, 161.2, 161.3, 166.1, 179.1, 42, 455/44, 226.1, 226.2
See application file for complete search history.

(56) References Cited

U.S. PATENT DOCUMENTS 5,511,235 A * 4/1996 Duong et al. ................. 455/75
5,577,076 A * 11/1996 Sato et al. ................. 375/346
6,122,493 A    9/2000 Kobayashi et al.

FOREIGN PATENT DOCUMENTS

JP         09-046184       2/1997

* cited by examiner

*Primary Examiner*—Nguyen T. Vo
(74) *Attorney, Agent, or Firm*—Brinks Hofer Gilson & Lione

(57) ABSTRACT

While a plurality of seek object frequencies decided in advance is being set as a receiving frequency in order, seek object frequencies meeting at least the following conditions are selected. The electric field strength of a seek object frequency being currently received must exceed a predetermined threshold value ThE. The second intermediate-frequency signal of the seek object frequency being received must be in a prescribed frequency band. When the electric field strength of a neighboring seek object frequency meets the first and second conditions, the absolute value of the difference between the electric field strength of the neighboring seek object frequency whose electric field strength exceeds ThE and the electric field strength of the seek object frequency being received must not exceed a predetermined threshold value h. The modulation factor of the seek object frequency being received must not exceed a threshold value ThM.

20 Claims, 5 Drawing Sheets

AUDIO BROADCAST RECEIVER AND AUTOMATIC BROADCASTING-STATION SELECTING METHOD

BACKGROUND OF THE INVENTION

1. Field of the Invention

The present invention relates to an audio broadcast receiver for receiving AM, FM, and other analog audio broadcasts and more particularly to an audio broadcast receiver in which automatic broadcasting-station selection is performed.

2. Description of the Related Art

Automatic broadcasting-station selection in audio broadcast receivers is a technology in which automatic searching for audio broadcast frequencies with good reception is performed, an audio broadcast is received at the frequency found, and the audio broadcast is reproduced.

As such an automatic broadcasting-station selecting technology, there is a known technology in which, while receiving frequencies are changed, a frequency at which an electric field strength equal to or more than a predetermined value can be obtained and the intermediate frequency converted from the receiving signal is in a prescribed frequency band is searched for, the searched-for frequency is fixed as a receiving frequency, and a broadcast at the receiving frequency is received and reproduced to users (for example, Japanese Unexamined Patent Application Publication No. 9-46184).

According to the above conventional technology in which automatic broadcasting-station selection is performed in accordance with the received electric field strength and the intermediate frequency, when spurious noise (unwanted waves) exists, there are cases in which audio broadcasting stations to be correctly and well received cannot be selected.

Furthermore, in the case where IBOC (In-band On-channel) audio broadcasting is performed where digital broadcasting is carried out by using an analog broadcast frequency band, when an analog audio broadcast is automatically searched for, it becomes impossible to select an analog audio broadcast which can be correctly and well received because of the influence of digital broadcasting.

Here, in FIGS. 5A to 5D, the spectrum distribution in AM audio broadcasting of the IBOC method is shown. In IBOC AM audio broadcasting, there are full-digital broadcasting where only digital broadcasting is performed and half-digital broadcasting where digital broadcasting is multiplexed with analog audio broadcasting. The spectrum distribution of half-digital broadcasting is shown in FIG. 5A and the spectrum distribution of full-digital broadcasting is shown in FIG. 5B.

In the USA where IBOC AM audio broadcasting is performed, since broadcast frequencies are distributed among AM audio broadcasting stations so that the broadcast frequencies are multiples of 10 kHz, in audio broadcast receivers, it is necessary to search for analog audio broadcast that can be well received while receiving frequencies which are changed in units of 10 kHz.

Then, according to the above conventional technology in which automatic broadcasting-station selection is performed in accordance with the received electric field strength and the intermediate frequency, full-digital broadcast frequencies shown in FIG. 5B are also judged to be broadcast frequencies where audio broadcasts can be well received, and, as a result, although analog audio broadcasts are not contained within the broadcast frequencies, the broadcast frequencies are fixed and the receiver starts to reproduce them to users.

Furthermore, as understood from FIGS. 5A and 5B, since the spectrum of digital broadcasting in IBOC AM audio broadcasting is distributed beyond a 10 kHz range centered around the broadcasting frequency, although neighboring frequencies at intervals of 10 kHz and analog broadcasts that can be well received at those frequencies do not exist, those frequencies are judged to be broadcasting frequencies where audio broadcast can be well received, and the broadcasting frequencies are thus fixed and the receiver starts to reproduce them to users.

SUMMARY OF THE INVENTION

Accordingly, it is an object of the present invention to provide an audio broadcast receiver that is able to search for analog broadcasts which can be appropriately and well received.

In order to attain the above object, an audio broadcast receiver for receiving an analog audio broadcast of the present invention comprises a broadcasting-station selecting portion for receiving RF signals of a fixed receiving frequency; a demodulating portion for demodulating the RF signals received by the broadcasting-station selecting portion to recover analog audio signals with which the RF signals were originally modulated; an electric field strength detecting portion for detecting the electric field strength of the RF signals received by the electric field strength detecting portion; a modulation factor detecting portion for detecting an evaluation value indicating a modulation factor of the RF signals, modulated with the analog audio signals, received by the broadcasting-station selecting portion; and an automatic broadcasting-station selecting portion in which, while the receiving frequency fixed in the broadcasting-selecting portion is being changed, a receiving frequency indicating that, at least, the electric field strength detected by the electric field detecting portion is equal to or larger than a predetermined level and the evaluation value detected by the modulation factor detecting portion indicates a modulation factor being equal to or larger than a predetermined level is searched for and then the searched-for receiving frequency is set as a subsequent receiving frequency.

According to such an audio broadcast receiver, frequencies whose modulation factor is less than a predetermined level are removed from the final receiving frequencies to be set as the result of the search. Accordingly, automatic broadcasting-station selection in which frequencies giving only low modulation factors and low-quality analog broadcasts are removed and in which frequencies giving high-quality analog broadcasts are searched for can be realized. Furthermore, an analog broadcast is searched for in a frequency band where digital broadcasting is also performed. An automatic broadcasting-station selection in which an analog audio broadcast with good reception is searched for can be realized while frequencies where only digital broadcasting is performed are removed.

In such an audio broadcast receiver, the demodulating portion may have a mixer for mixing an RF signal received by the broadcasting-station selecting portion with an intermediate-frequency signal and a detector for demodulating the intermediate-frequency signal converted by the mixer to recover an analog audio signal. The audio broadcast receiver also may have an intermediate-frequency detecting portion, for detecting whether the frequency of the intermediate-frequency signal converted by the mixer is within a prescribed frequency range, and an automatic broadcasting-station selecting portion. In the automatic broadcasting-station selecting portion, while the receiving frequency fixed in the broadcasting is being changed, a receiving frequency indicating that, at least, the electric field strength detected in the electric field strength detecting portion is equal to or larger than a predetermined level, the evaluation value detected in the modulation factor detecting portion indicates a modulation factor being equal to or larger than a predetermined level. In the intermediate-frequency detecting portion, the frequency of the intermediate-frequency signal in a prescribed frequency band is searched for, and then the searched-for receiving frequency is set as a subsequent receiving frequency.

In this way, superior automatic broadcasting-station selection in which frequencies generating spurious noise are removed can be realized.

Here, in the modulation factor detecting portion, since the level of an analog audio signal recovered by the demodulating portion approximately indicates the modulation factor in the range of the electric field strength beyond the saturation point determined in accordance with an input sensitivity of the audio broadcast receiver, the level of an analog audio signal recovered by the demodulating portion may be detected as an evaluation value showing the modulation factor.

In this way, the modulation factor can be detected with a simple construction.

Alternately, in the modulation factor detecting portion, a value obtained by correcting the level of an analog audio signal recovered by the demodulating portion in accordance with the difference between the saturation value of an electric field strength, which can be detected by the electric field detecting portion, determined in accordance with an input sensitivity of the audio broadcast receiver and an electric field strength detected by the electric field strength detecting portion may be detected as an evaluation value indicating the modulation factor.

In this way, for example, also in the range of the electric field strength before the saturation point determined in accordance with the input sensitivity of the audio broadcast receiver, an evaluation value approximately indicating the modulation factor can be detected with a simple construction.

DESCRIPTION OF THE PREFERRED EMBODIMENT

Hereinafter, an embodiment of the present invention, which is applied, for example, to audio broadcast receivers for receiving AM analog audio broadcasts and reproducing those to users in an area where IBOC AM broadcasting is performed, is described.

Figure 1:
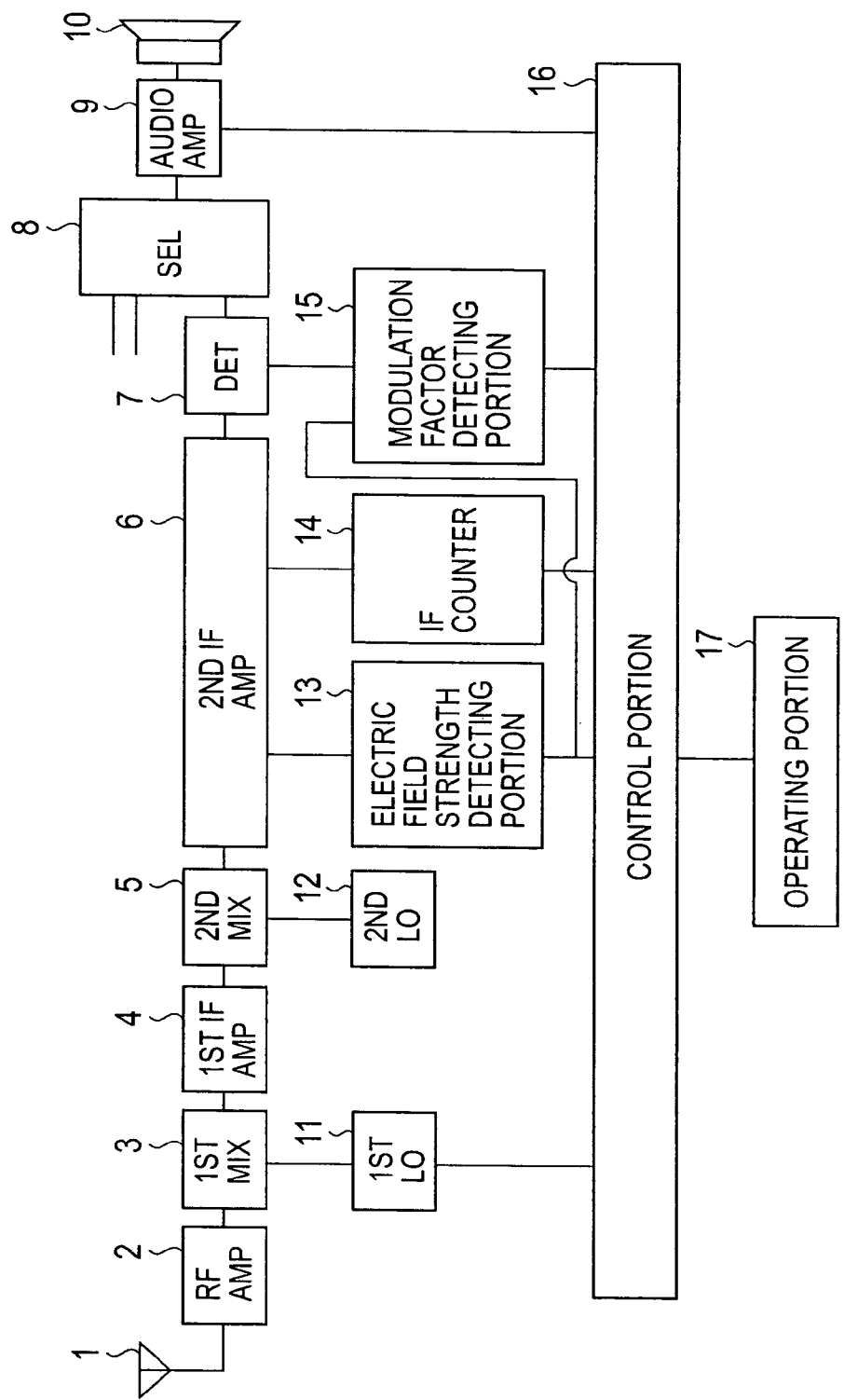
FIG. 1 is a block diagram showing the construction of an audio broadcast receiver according to an embodiment of the present invention.

FIG. 1 shows the construction of an audio broadcast receiver according to the present embodiment.

As shown in the drawing, the audio broadcast receiver contains an antenna 1, an RF amplifier 2 (RF AMP) for amplifying an RF signal received by the antenna 1, a first mixer 3 (1st MIX) for generating a first intermediate-frequency signal in which the amplified RF signal is mixed with a first local oscillation signal generated by a first local oscillator 11 (1st LO), a first intermediate-frequency signal amplifier 4 (1st IF AMP) for amplifying the first intermediate-frequency signal, a second mixer 5 (2nd MIX) for generating a second intermediate-frequency signal by mixing the amplified first intermediate-frequency signal with a second local oscillation signal generated by a second local oscillator 12 (2nd LO), a second intermediate-frequency signal amplifier 6 (2nd IF AMP) for amplifying the second intermediate-frequency signal, a detector 7 (DET) for detecting and recovering an analog audio signal by demodulating the amplified second intermediate-frequency signal, a selector 8 (SEL) for selecting and generating either the audio signal output from the detector 7 or an audio signal input from another piece of audio equipment (not illustrated), and an audio amplifier 9 (Audio AMP) for amplifying the audio signal generated by the selector 8 and sending the signal to a speaker 10.

Thus, the present audio broadcast receiver is an audio broadcast receiver of the double superheterodyne type. Furthermore, the first local oscillator 11 is a local oscillator made of a PLL synthesizer in which the frequency signal is controlled such that, in response to a received signal, a second intermediate-frequency signal of a predetermined frequency is obtained at the second mixer 5 based on a second oscillation signal of a fixed frequency.

Furthermore, the present audio broadcast receiver contains an electric field strength detecting portion 13 for detecting the electric field strength of an RF signal being received from the second intermediate-frequency signal, an IF counter 14 for detecting whether the second intermediate-frequency signal exists in a prescribed frequency band (a 10-kHz range centered on 50 kHz), a modulation factor detecting portion 15 for detecting the electric field strength of the RF signal being received and the modulation factor of the RF signal being received from an analog audio signal recovered by the detector 7, an operating portion 17 for accepting user operations, and a control portion 16 for switching the receiving frequency by controlling the oscillation frequency of the first local oscillator 11 and adjusting the sound volume output from the speaker 10 in accordance with the user operation of the operation portion 17.

When constructed in this way, the control portion 16 performs an automatic broadcasting-station selecting process in accordance with user operation of the operating portion 17, as follows.

In the automatic broadcasting-station selecting process, while controlling the first local oscillator 11, the control portion 16 searches an AM band (for example, a 530 kHz to 1710 kHz band) for analog audio broadcasts that can be well received by changing the receiving frequency at intervals of 10 kHz, based on the output from the electric field strength detecting portion 13, the IF counter 14, and the modulation factor detecting portion 15. Then, when the search is performed well, the searched-for frequency is set as the receiving frequency and the analog audio broadcast at this frequency is received and reproduced to users.

However, the receiving frequency is always multiples of 10 kHz. In this description, for convenience's sake, each frequency, which is a multiple of 10 kHz, in the AM band is called a seek object frequency. Furthermore, a second seek object frequency, which is 10 kHz lower than a first seek object frequency, is called the preceding seek object frequency of the first seek object frequency. A third seek object frequency, which is 10 kHz higher than the first seek object frequency, is called the following seek object frequency of the first seek object frequency. Also the second seek object frequency and the third seek object frequency are together called seek object frequencies neighboring the first seek object frequency.

Now, in the automatic broadcasting-station selecting process, when the following four conditions are met, a seek object frequency being received is judged to be a receiving frequency of an analog audio broadcast that is well received.

First condition: The electric field strength of a seek object frequency being received is over a predetermined threshold value ThE.

Second condition: The second intermediate-frequency signal of the seek object frequency being received is in a prescribed frequency band.

Third condition: When the electric field strength of either neighboring seek object frequency meets the first and second conditions, the absolute value of the difference between the electric field strength of the neighboring seek object frequency, which is over the threshold value ThE, and the electric field strength of the seek object frequency being received must not exceed a predetermined threshold value h.

Fourth condition: The modulation factor of the seek object frequency being received must exceed a threshold value ThM.

Here, the third condition is provided so that the seek object frequency being received is not wrongly judged to be a receiving frequency of an analog audio broadcast that can be well received due to spurious noise generated in the seek object frequency being currently received, which is caused by audio analog broadcasts at the neighboring seek object frequencies next to the seek object frequency being received.

Figure 2A:
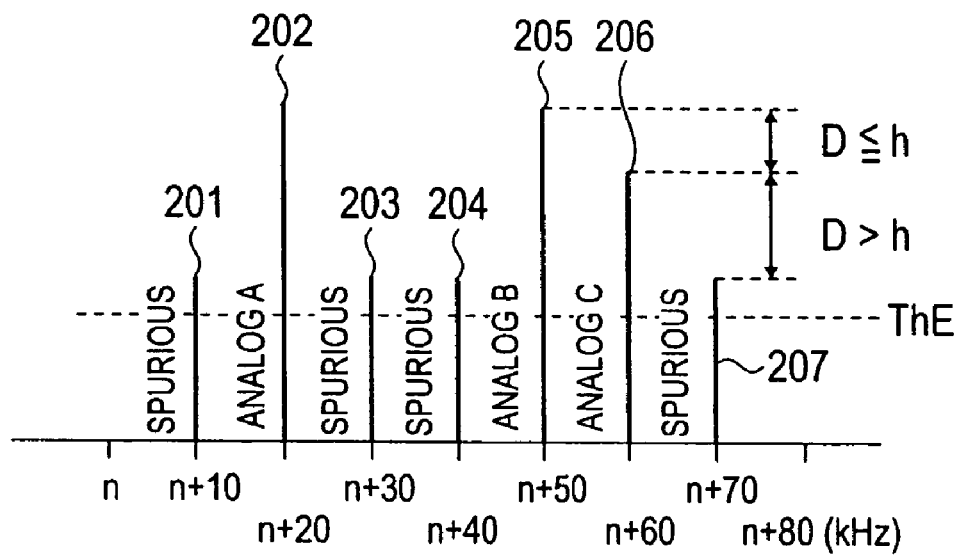
FIGS. 2A and 2B show examples of the automatic broadcasting-station selecting operation according to the embodiment of the present invention.

That is, as shown in FIG. 2A, when analog audio broadcasting of Analog A, B, and C is performed at frequencies 202, 205, and 206 and spurious noise caused by the analog audio broadcasting performed at the neighboring seek object frequencies are generated at seek object frequencies 201, 203, 204, and 207, as shown in the drawing, there are cases in which all of the first, second, third, and fourth conditions are met at the seek object frequencies 201, 203, 204, and 207 where the spurious noise is generated. Then, in order to investigate the possibility that analog audio broadcasting is performed at the neighboring seek object frequencies, it is determined whether the first and second conditions are met. When analog audio broadcasting is performed at the neighboring seek object frequencies, since the seek object frequency being received may be spurious noise, the absolute value of the difference between the electric field strength of the analog audio broadcasting being performed at the neighboring seek object frequencies and the electric field strength of the seek object frequency being received is further investigated. Here, if the seek object frequency being received is spurious noise, the absolute value of the difference is larger when compared with the case when the frequency is that of an analog audio broadcast and, as a result, the absolute value exceeds the threshold value h. Then, if the absolute value of the difference exceeds the threshold value h, the received RF signal of the seek object frequency being received is spurious noise and judged as not being a receiving frequency of an analog audio broadcast that can be well received. On the other hand, if the absolute value of the difference is equal to or less than the threshold value h, considering the possibility that the seek object frequency being received is a frequency where analog audio broadcasting is performed, the next condition is judged. As a result, the seek object frequencies 201, 203, 204, and 207 where spurious noise is generated, as shown in FIG. 2A, do not meet the third condition, and the frequencies 202, 205, and 206 where analog audio broadcasting of Analog A, B, and C is performed meet the third condition, even if spurious noise is generated at neighboring seek object frequencies or analog audio broadcasting is performed at neighboring seek object frequencies.

Moreover, as the third condition, the check of the second condition about neighboring seek object frequencies is omitted, and a condition in that, when the electric field strength of the neighboring seek object frequencies meet the first condition, the absolute value of the difference between the electric field strength of the neighboring seek object frequencies, which exceed ThE, and the electric field strength of a seek object frequency being received must not exceed a predetermined threshold value h, may be used.

Furthermore, the fourth condition is provided to eliminate the case in which, when a seek object frequency being received is one of the frequencies where only digital broadcasting is performed, the frequency is wrongly judged to be a receiving frequency of an analog audio broadcast that can be well received.

Figure 2B:
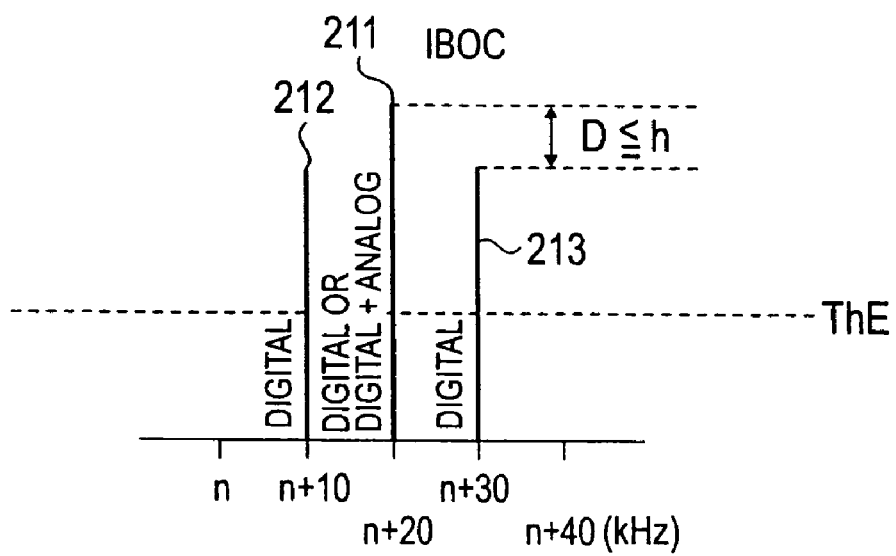
Figure 5A:
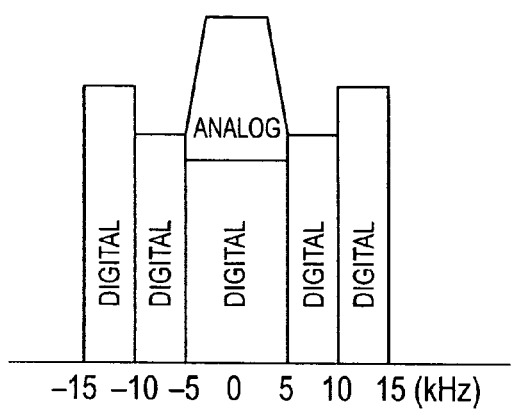
FIGS. 5A to 5D show the spectrum distribution in IBOC broadcasting.
Figure 5B:
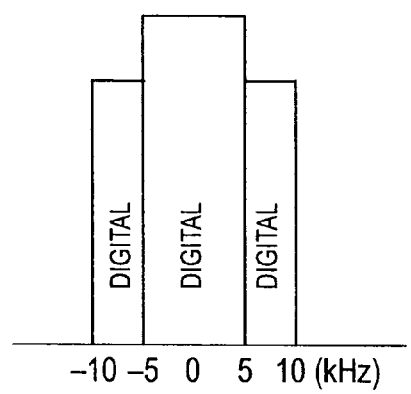

That is, as shown in FIG. 2B, there are cases where the first, second, and third conditions are met at a seek object frequency 211 corresponding to an IBOC broadcasting frequency and seek object frequencies 212 and 213 neighboring the frequency 211. Moreover, digital broadcasting is performed at the seek object frequencies 212 and 213 neighboring the seek object frequency 211 corresponding to the IBOC broadcasting frequency, and since the electric field strength is higher than the electric field strength of spurious noise shown in FIG. 2A, the seek object frequency meets the third condition. On the other hand, in the case of full-digital IBOC broadcasting, since the seek object frequency 211 corresponding to a broadcasting frequency and the seek object frequencies 212 and 213 neighboring the frequency 211 mean frequencies where only digital broadcasting is performed (see FIG. 5B), the modulation factor to be detected becomes smaller than an appropriately set threshold value ThM. Furthermore, in the case of half-digital IBOC broadcasting, because the seek object frequencies 212 and 213 neighboring the seek object frequency corresponding to a broadcasting frequency mean frequencies where only digital broadcasting is performed (see FIG. 5A), the modulation factor to be detected is smaller than an appropriately set threshold value ThM.

Accordingly, since the seek object frequencies where only digital broadcasting is performed do not meet the fourth condition, there is no case in which these frequencies are judged as being receiving frequencies in which analog audio broadcasts are well received. On the other hand, in the case of the frequency 211 where half-digital IBOC broadcasting is performed, since analog broadcasting is performed at the frequency and the fourth condition is met, the frequency 211 is judged as being a receiving frequency at which an analog audio broadcast can be properly received.

Now, in the fourth condition, the threshold value ThM to be used in judging the modulation factor is set as described below.

Figure 3:
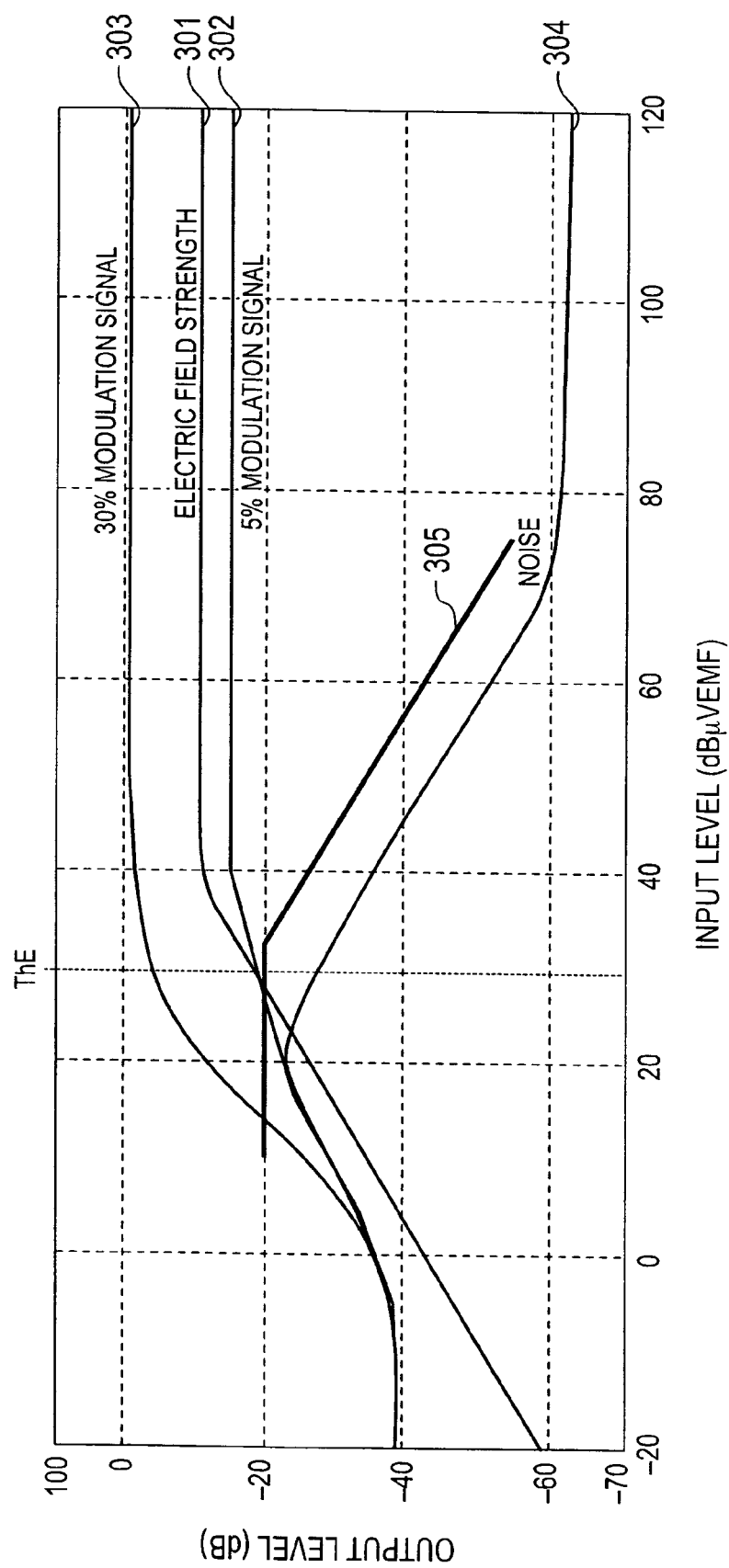
FIG. 3 shows how to set the threshold value of a modulation factor used in the embodiment of the present invention.

FIG. 3 shows the input sensitivity of audio broadcast receivers.

In the drawing, the horizontal axis shows the degree of the actual received electric field strength 301. The vertical axis shows the degree of an electric field strength detected in the electric field strength detection portion 13, the amplitude of an analog audio signal 302 recovered by the detector 7 in the case where the modulation factor of a receiving RF signal is 5%, the amplitude of an analog audio signal 303 recovered by the detector 7 in the case where the modulation factor of a receiving RF signal is 30%, the degree of noise 304 where there is no influence of digital broadcasting, and the maximum level of noise 305 in the case where digital broadcasting is performed at receiving frequencies.

As shown in the drawing, when the received electric field strength increases, the increase of the electric field strength 301 detected in the electric field strength detecting portion 13 is saturated at a saturation point (−10 dB in the drawing) as the input sensitivity increases. Furthermore, in the same way, the increases of the analog audio signals 302 and 303 are saturated at saturation points corresponding to the modulation factors.

Now, when the threshold value ThE to be used in the first condition is set as shown in the drawing, the level of noise 305 observed from digital broadcasting in the range is made lower than the level of the analog audio signal 302 obtained from analog audio broadcasting of 5% modulation to have an appropriate margin beyond the threshold value ThE.

Therefore, in an audio broadcast receiver having the characteristics shown in the drawing, the threshold value ThM to be used in judging the modulation may be set to be 5% in the fourth condition.

Now, the approximate calculation of the modulation factor in the modulation factor detecting portion 15 may be made using the level and the electric field strength of the demodulated analog audio signal.

When the electric field strength to be detected is equal to or larger than the saturation value of the detected electric field strength:

Modulation factor=$K$×analog audio signal level
   (peak to peak value)

When, the electric field strength to be detected is smaller than the saturation value of the detected electric field strength:

Modulation factor=$K$×{analog audio signal level×$L$×
   (saturation value of detected electric field
   strength−detected electric field strength)}

Here, K is a conversion constant or conversion function between the analog audio signal level and the modulation factor in the case where the detected electric field strength is equal to or larger than the saturation value of the detected electric field strength.

Furthermore, L is a correction constant or correction function to cancel the difference between an analog audio signal level generated when the detected electric field strength is between the saturation value of the detected field strength and the threshold value ThE and an analog audio signal level when the detected electric field strength is equal to or larger than the saturation value of detected field strength.

Moreover, when the threshold value ThE of the electric field strength is set in the vicinity of the saturation value of the detected electric field strength, the analog audio signal level may be directly used as an approximate modulation factor at the modulation factor detecting portion 15.

Furthermore, the judgement of the fourth condition is performed such that the fourth condition is considered to be met when a modulation factor continuously exceeds the threshold value h for a certain period (for example, 10 msec) within a predetermined period T (for example, 1000 to 2000 msec).

Now, in the automatic broadcasting-station selecting operation, the control portion 16 judges whether the seek object frequency being received meets the above four conditions in the order of the first, second, third, and fourth conditions every time the receiving frequency is changed in 10-kHz units of the seek object frequency, and, when any condition is not met, no further conditions are judged and the seek object frequency being received is immediately changed to the following seek object frequency. On the other hand, when the seek object frequency being received meets all four conditions, the seek object frequency being received is set as the receiving frequency, the analog audio broadcast at the receiving frequency is received and reproduced to users.

Hereinafter, the concrete process of the above automatic broadcasting-station selection is described.

Figure 4:
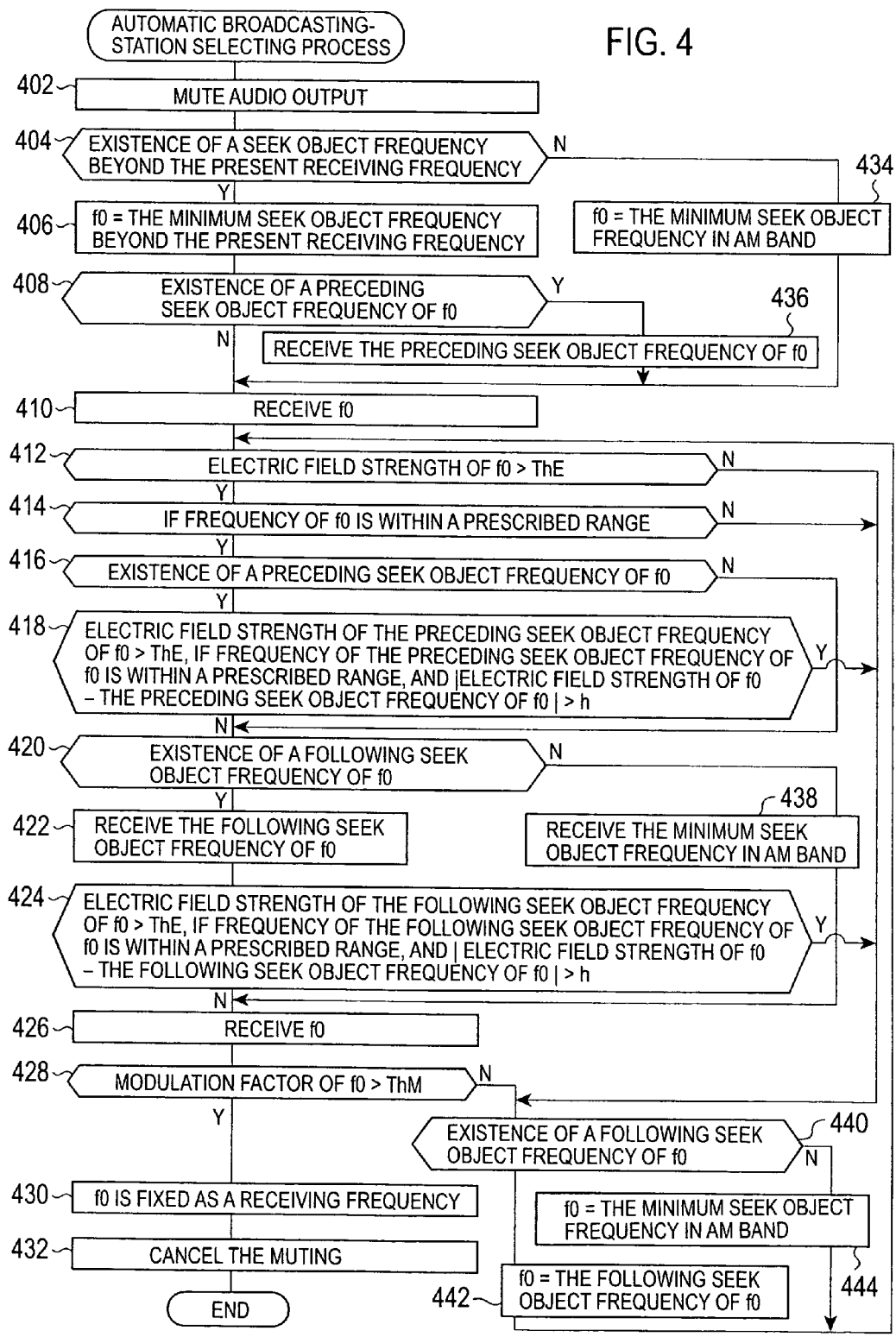
FIG. 4 is a flow chart showing an automatic broadcasting-station selecting process according to the embodiment of the present invention.

FIG. 4 shows an automatic broadcasting-station selecting process.

As shown in the drawing, in the process, first of all, the audio amplifier 9 is controlled to mute the output to the speaker 10 (step 402). Then, it is investigated whether a seek object frequency having a frequency beyond the present receiving frequency (a receiving frequency decided by the first local oscillation signal frequency set in the first local oscillator 11) (step 404) exists, and, when such a frequency does not exist, the minimum seek object frequency in an AM band is made f0 (step 434), and the process goes to step 410.

On the other hand, in the case where a seek object frequency having a frequency beyond the present receiving frequency exists (step 404), the minimum seek object frequency beyond the present receiving frequency is made f0 (step 406). Then, it is investigated whether a seek object frequency exists before f0 (step 408), and, when such a frequency does not exist, the process goes to step 410. When the frequency exists, the receiving frequency is set to be the seek object frequency before f0, then, the seek object frequency before f0 is received, and the process goes to step 410 after the electric field strength is detected in the electric field strength detecting portion 13 and the IF frequency of the IF counter 14 has been checked (step 436).

Now, in step 410, the receiving frequency is set at f0 to receive f0, and, at the frequency f0, the electric field strength is detected in the electric field strength detecting portion 13 and the IF frequency is checked in the IF counter. Then, it is judged whether the electric field strength of f0 exceeds the threshold value ThE (step 412), and, when the electric field strength of f0 does not exceed the threshold value ThE, the process goes to step 410. On the other hand, when the electric field strength of f0 exceeds the threshold value ThE, since the first condition is met, it is judged whether the IF frequency of f0 is within a prescribed frequency range (step 414). When the IF frequency of f0 is not within the prescribed frequency range, the process goes to step 440. On the other hand, when the IF frequency of f0 is within the prescribed frequency range, since the second condition is met, the process goes to step 416 and subsequent steps and it is judged whether the third condition is met.

That is, in step 416, it is judged whether a preceding seek object frequency of f0 exists, and, when such a preceding seek object frequency does not exist, since the third condition is not met regarding the preceding seek object frequency of f0, the process goes to step 420 and it is judged whether the third condition is met regarding a following seek object frequency of fo. On the other hand, when the preceding seek object frequency exists, the process goes to step 418 and the following judgement is performed based on the electric field strength of the preceding seek object frequency of f0 in step 436 and the result of checking the IF frequency.

That is, in step 418, it is judged whether the electric field strength of the preceding seek object frequency of f0 exceeds the threshold value ThE, the IF frequency of the preceding seek object frequency of f0 is within a prescribed frequency range, and the absolute value of the difference between the electric field strength of the preceding seek object frequency of f0 and the electric field strength of f0 exceeds the threshold value h, and, when result of the judgement is true, since the third condition is not met regarding the preceding seek object frequency of f0, the process goes to step 440. On the other hand, when the result of the judgement is false, since the third condition is met regarding the preceding seek object frequency of f0, the process goes to step 420 and it is judged whether the third condition is met regarding the following seek object frequency of f0.

That is, in step 420, it is judged whether a following seek object frequency of f0 exists, and, when such a following seek object frequency does not exist, since the fourth condition is not met regarding the preceding and following seek object frequencies of f0, the process goes to step 438, and the process goes to step 426 after the minimum seek object frequency is received in an AM band, the electric field strength is detected in the electric field strength detecting portion 13, and the IF frequency has been checked in the IF counter.

On the other hand, if the following seek object frequency of f0 exists, the receiving frequency is set at the following seek object frequency of f0 (step 422), the following seek object frequency of f0 is received, and the electric field strength is detected in the electric field detecting portion 13 and the IF frequency is checked in the IF counter 14. Then, the following judgement is performed in step 424 based on the result of checking the electric field strength and the IF frequency of the following seek object frequency of f0.

That is, in step 424, it is judged whether the electric field strength of the following seek object frequency of f0 exceeds the threshold value ThE, the IF frequency of the following seek object frequency of f0 is within a described frequency range, and the absolute value of the difference between the electric field strength of the following seek object frequency of f0 and the electric field strength of f0 exceeds the threshold value h, and, when the result of the judgement is true, since the third condition is not met regarding the following seek object frequency of f0, the process goes to step 440. On the other hand, when the result of the judgement is false, since the third condition is met, the process goes to step 426 and the following steps and it is judged whether the fourth condition is met.

That is, in step 426, the receiving frequency is set at f0 and the modulation factor of f0 is checked. Then, in step 428, it is judged whether the modulation factor of f0 continuously exceeds the threshold value ThM for a predetermined period or more within a period T, and when the modulation factor of f0 continuously exceeds the threshold value ThM for a predetermine period or more, it is considered that the fourth condition is met as soon as the modulation factor of f0 exceeds the threshold value ThM for a predetermined period, the receiving frequency is fixed at f0 (step 430), the muting of output volume from the audio amplifier 9 is cancelled (step 432), and the process is finished. On the other hand, when the modulation factor of f0 does not continuously exceed the threshold value ThM for a predetermine period during a period T, it is considered that the fourth condition is not met and the process goes to step 444.

Then, in step 440, it is investigated whether a following seek object frequency of f0 exists, and, when no following seek object frequency of f0 exists, the minimum seek object frequency in an AM band is made f0 (step 444), and the process goes to step 412. On the other hand, when a following seek object frequency of f0 exists, the following seek object frequency of f0 is set to be f0 (step 442), and the process returns to step 412.

Then, after the process returns to step 412, the above processing is carried out regarding the newly set f0. Moreover, in the following processing, the result of the electric field strength and the IF frequency regarding the present-frequency f0 checked and obtained in step 422 or step 438 the last time is used as the electric field strength and IF frequency of f0 to be used in the judgement in steps 412 and 414, and the result of the electric field strength and IF frequency regarding the preceding seek object frequency of f0 checked and obtained in step 422 or step 438 twice before or in step 410 is used as the electric field strength and the IF frequency of the preceding seek object frequency of f0 to be used in the judgement in step 418. However, at each judgement, a necessary seek object frequency is received and the electric field strength and IF frequency of the seek object frequency may be checked to obtain the result.

An embodiment of the present invention was described in the above.

Figure 5C:
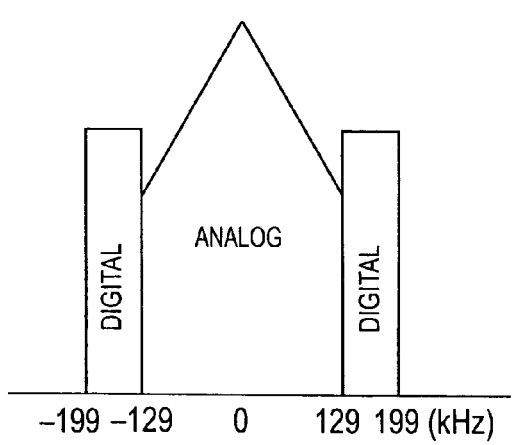
Figure 5D:
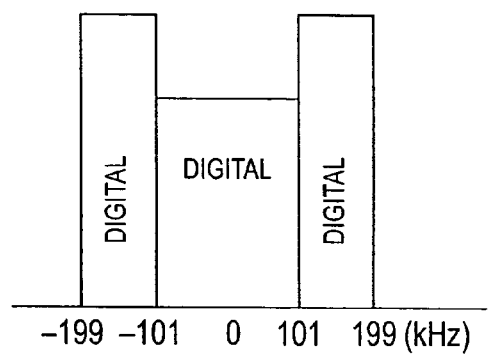

Moreover, although the application to an audio broadcast receiver that receives an AM analog audio broadcast and outputs it to users in an area where IBOC AM broadcasting is performed was described above, as an example, also the automatic broadcasting-station selecting technology according to the present invention can be applied in the same way to an audio broadcast receiver that receives an FM analog audio broadcast and reproduces it to users in an area where IBOC FM broadcasting is performed. That is, as the case of half-digital IBOC broadcasting is shown in FIG. 5C and the case of full-digital IBOC broadcasting is shown in FIG. 5D, since IBOC FM broadcasting has a wide spectrum of about 400 kHz in digital broadcasting when compared with a spectrum of 180 kHz in FM analog audio broadcasting, the same situation as that in IBOC AM broadcasting occurs and accordingly, the above automatic broadcasting-station selecting technology is also effective in FM broadcasting in the same way as in the case of AM broadcasting.

Furthermore, the above automatic broadcasting-station selecting technology in which the modulation factor is carefully considered is effective in improving the reliability of an automatic broadcasting-station selecting operation when only ordinary analog audio AM broadcasts and FM broadcasts are received in an area where IBOC broadcasting is not performed.

As described above, according to the present invention, it is possible to provide an audio broadcast receiver in which analog broadcasts with good reception can be searched for.

What is claimed is:

1. An audio broadcast receiver for receiving an analog audio broadcast comprising:
   a station selecting portion for receiving RF signals of a fixed receiving frequency;
   a demodulating portion for demodulating the RF signals received in the station selecting portion to recover analog audio signals with which the RF signals were originally modulated;
   an electric field strength detecting portion for detecting the electric field strength of the RF signals received by the electric field strength detecting portion;
   a modulation factor detecting portion for detecting an evaluation value indicating a modulation factor of the RF signals, modulated with the analog audio signals, received in the station selecting portion; and
   an automatic station selecting portion in which, while the receiving frequency is being changed, a receiving frequency having an electric field strength that is equal to or larger than a predetermined level and an evaluation value that indicates a modulation factor being equal to or larger than a predetermined level is searched for, and then the searched for receiving frequency is set as a subsequent receiving frequency.

2. An audio broadcast receiver as claimed in claim 1,
   wherein, the demodulating portion includes a mixer for mixing an RF signal received in the station selecting portion with an intermediate frequency signal and a detector for demodulating the intermediate frequency signal converted by the mixer to recover an analog audio signal;
   the receiver having an intermediate frequency detecting portion for detecting whether the frequency of the intermediate frequency signal converted by the mixer is within a prescribed frequency range; and
   while the receiving frequency is being changed, a receiving frequency further having an intermediate frequency signal in a prescribed frequency band is searched for before setting the searched for receiving frequency as a subsequent receiving frequency.

3. An audio broadcast receiver as claimed in claim 2,
   wherein, in the modulation factor detecting portion, the level of an analog audio signal recovered by the demodulating portion is detected as an evaluation value indicating the modulation factor.

4. An audio broadcast receiver as claimed in claim 3,
   wherein an analog audio broadcast with which a digital broadcast is multiplexed is received.

5. An audio broadcast receiver as claimed in claim 2,
   wherein, in the modulation factor detecting portion, a value obtained by correcting the level of an analog audio signal recovered by the demodulating portion in accordance with the difference between the saturation value of an electric field strength, which can be detected by the electric field detecting portion, determined in accordance with an input sensitivity of the audio broadcast receiver and an electric field strength detected by the electric field strength detecting portion is detected as an evaluation value indicating the modulation factor.

6. An audio broadcast receiver as claimed in claim 5,
   wherein an analog audio broadcast with which a digital broadcast is multiplexed is received.

7. An audio broadcast receiver as claimed in claim 1,
   wherein, in the modulation factor detecting portion, the level of an analog audio signal recovered by the demodulating portion is detected as an evaluation value indicating the modulation factor.

8. An audio broadcast receiver as claimed in claim 7,
   wherein an analog audio broadcast with which a digital broadcast is multiplexed is received.

9. An audio broadcast receiver as claimed in claim 1,
   wherein, in the modulation factor detecting portion, a value obtained by correcting the level of an analog audio signal recovered by the demodulating portion in accordance with the difference between the saturation value of an electric field strength, which can be detected by the electric field detecting portion, determined in accordance with an input sensitivity of the audio broadcast receiver and an electric field strength detected by the electric field strength detecting portion is detected as an evaluation value indicating the modulation factor.

10. An audio broadcast receiver as claimed in claim 9,
    wherein an analog audio broadcast with which a digital broadcast is multiplexed is received.

11. An automatic station selecting method in which, in an audio broadcast receiver for receiving an analog audio broadcast, an analog broadcasting frequency with good reception is searched for and received, the method comprising:
    detecting the electric field strength of a received RF signal and an evaluation value indicating the modulation factor of the RF signal modulated with an analog audio signal while a receiving frequency, serving as a receiving object frequency, is being changed until the search is finished; and
    finishing the search when it is shown that the detected electric field strength is equal to or larger than a predetermined level and the detected evaluation value is equal to or larger than a predetermined level.

12. An automatic station selecting method as claimed in claim 11, further comprising:
    muting audio output at the start of the search; and
    stopping the muting of audio output.

13. An automatic station selecting method as claimed in claim 11, further comprising:
    detecting whether an intermediate frequency signal into which the received RF signal is converted is within a prescribed frequency range.

14. An automatic station selecting method as claimed in claim 13, wherein an analog audio broadcast with which a digital broadcast is multiplexed is received.

15. An automatic station selecting method as claimed in claim 14, further comprising:
    detecting whether the absolute value of the difference between the electric field strength of the RF signal of a seek object frequency and the electric field strength of the RF signal of a neighboring frequency a predetermined frequency range away from the seek object frequency is equal to or larger than a predetermined level.

16. An automatic station selecting method as claimed in claim 14, further comprising:
    finishing the search only if the intermediate frequency signal is within a prescribed frequency range.

17. An automatic station selecting method in which, in an audio broadcast receiver for receiving an analog audio broadcast, an analog broadcasting frequency with good reception is searched for and received, the method comprising:
    detecting the electric field strength of a received RF signal and an evaluation value indicating the modulation factor of the RF signal modulated with an analog audio signal and detecting whether an intermediate frequency signal into which the received RF signal is converted is within a prescribed frequency range while a receiving frequency, serving as a receiving object frequency, is being changed until the search is finished; and finishing the search when it is shown that, at least, the detected electric field strength is equal to or larger than a predetermined level, the detected evaluation value is equal to or larger than a predetermined level, and the intermediate frequency signal is within the prescribed frequency band.

18. An automatic station selecting method as claimed in claim 17, further comprising:

muting audio output at the start of the search; and
stopping the muting of audio output.

19. An automatic station selecting method in which, in an audio broadcast receiver for receiving an analog audio broadcast, an analog broadcasting frequency with good reception is searched for and received, the method comprising:

setting a plurality of predetermined seek object frequencies as a receiving frequency in order;

detecting whether the electric field strength of the RF signal of a seek object frequency is equal to or larger than a predetermined level;

detecting whether an intermediate frequency signal into which the RF signal of the seek object frequency is converted is within a prescribed frequency band;

detecting whether the absolute value of the difference between the electric field strength of the RF signal of a seek object frequency and the electric field strength of the RF signal of a preceding frequency or following frequency a predetermined frequency range away from the seek object frequency is equal to or larger than a predetermined level;

detecting whether the modulation factor of the RF signal, modulated with an analog audio signal, of the seek object frequency is equal to or larger than a predetermined value; and finishing the search when the detected electric field strength of the RF signal of a seek object frequency is equal to or larger than a predetermined level, the intermediate frequency signal into which the RF signal of a seek object frequency is converted is within a prescribed frequency range, the absolute value of the difference between the electric field strength of the RF signal of a seek object frequency and the electric field strength of the RF signal of a preceding frequency or following frequency a predetermined frequency range away from the seek object frequency is within a predetermined level, and the modulation factor of the RF signal modulated with an analog audio signal of the seek object frequency is equal to or larger than a predetermined level.

20. An automatic station selecting method as claimed in claim 19, further comprising:

muting audio output at the start of the search; and
stopping the muting of audio output.

* * * * *